United States Patent
Givoni et al.

(10) Patent No.: US 11,082,842 B2
(45) Date of Patent: *Aug. 3, 2021

(54) OPERATOR FORMED NETWORK CONSORTIUMS

(71) Applicant: ARRIS Enterprises LLC, Suwanee, GA (US)

(72) Inventors: Doron Givoni, Sunnyvale, CA (US); Dave Stephenson, San Jose, CA (US); Steve Martin, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,733

(22) Filed: Nov. 6, 2019

(65) Prior Publication Data

US 2020/0077277 A1 Mar. 5, 2020

Related U.S. Application Data

(63) Continuation of application No. 15/843,521, filed on Dec. 15, 2017, now Pat. No. 10,506,448, which is a
(Continued)

(51) Int. Cl.
*H04W 4/00* (2018.01)
*H04W 12/06* (2021.01)
(Continued)

(52) U.S. Cl.
CPC ............. *H04W 12/06* (2013.01); *H04W 8/18* (2013.01); *H04W 16/16* (2013.01); *H04W 24/02* (2013.01);
(Continued)

(58) Field of Classification Search
CPC ....... H04W 12/06; H04W 76/15; H04W 8/18; H04W 16/06; H04W 24/02; H04W 8/12;
(Continued)

(56) References Cited

U.S. PATENT DOCUMENTS

2003/0181207 A1* 9/2003 Kinnunen ............ H04W 88/12
455/435.1
2007/0104169 A1 5/2007 Polson
(Continued)

FOREIGN PATENT DOCUMENTS

| EP | 2023587 A1 | 2/2009 |
| ES | 2332492 A1 | 2/2010 |
| WO | 2005/076884 A2 | 8/2005 |

OTHER PUBLICATIONS

IEEE Standard for Information technology—Telecommunications and information exchange between systems: Local and metropolitan area networks—Specific requirements. Part 11: Wireless LAN Medium Access Control (MAC) and Physical Layer (PH) Specifications. IEEE Std 802.11-2012 (Revision of IEEE Std 802.11-2007). New York: IEEE Computer Society. Mar. 29, 2012.

*Primary Examiner* — Abdelnabi O Musa
(74) *Attorney, Agent, or Firm* — Stewart M. Wiener; Myers Bigel, P.A.

(57) ABSTRACT

Networking systems and methods here include utilizing an exchange service in communication with a network service, the network service being in communication with a first network and a second network, the exchange service configured to, receive a formation request to form a consortium of networks among the first network and second network, send provision information to a first AP in the first network regarding the second network and a second AP in the second network regarding the first network.

20 Claims, 6 Drawing Sheets

Related U.S. Application Data continuation of application No. PCT/US2015/068268, filed on Dec. 31, 2015.

(60) Provisional application No. 62/175,924, filed on Jun. 15, 2015.

(51) Int. Cl.
| | |
|---|---|
| *H04W 24/02* | (2009.01) |
| *H04W 76/15* | (2018.01) |
| *H04W 8/18* | (2009.01) |
| *H04W 16/16* | (2009.01) |
| *H04W 92/02* | (2009.01) |
| *H04W 8/12* | (2009.01) |
| *H04L 29/06* | (2006.01) |
| *H04W 88/18* | (2009.01) |
| *H04W 60/00* | (2009.01) |

(52) U.S. Cl.
CPC ........... *H04W 76/15* (2018.02); *H04W 92/02* (2013.01); *H04L 63/0815* (2013.01); *H04W 8/12* (2013.01); *H04W 60/005* (2013.01); *H04W 88/18* (2013.01)

(58) Field of Classification Search
CPC . H04L 29/06; H04L 63/0281; H04L 63/0815; H04L 41/0803
See application file for complete search history.

(56) References Cited

U.S. PATENT DOCUMENTS

| | | |
|---|---|---|
| 2010/0087221 A1 | 4/2010 | Srinivasan et al. |
| 2011/0111728 A1* | 5/2011 | Ferguson .............. H04W 76/50 455/404.2 |
| 2012/0185291 A1 | 7/2012 | Ramaswamy et al. |
| 2012/0189020 A1 | 7/2012 | Rustagi et al. |
| 2014/0051391 A1 | 2/2014 | Torres et al. |
| 2014/0153555 A1 | 6/2014 | Gupta |
| 2014/0165165 A1* | 6/2014 | Story, Jr. ......... H04W 12/04031 726/6 |
| 2015/0257179 A1* | 9/2015 | Kim .................... H04L 41/0803 370/328 |
| 2016/0248744 A1* | 8/2016 | Adderly ............. H04L 63/0281 |

\* cited by examiner

OPERATOR FORMED NETWORK CONSORTIUMS

CROSS REFERENCE TO RELATED CASES

This application is a continuation under 35 U.S.C. § 120 of U.S. Non-Provisional application Ser. No. 15/843,521, entitled "Operator Formed Network Consortiums," by Doron Givoni, et al., filed on Dec. 15, 2017, which is a continuation under 35 U.S.C. § 111(a) of PCT Application Ser. No. PCT/US15/68268 entitled "Operator Formed Network Consortiums," by Doron Givoni, et al., filed on Dec. 31, 2015 which claims priority under 35 U.S.C. 119(e) to U.S. provisional application Provisional Application Ser. No. 62/175,924, "Operator Formed Network Consortiums," by Doron Givoni, et al., filed on Jun. 15, 2015, the contents of all of which are herein incorporated by reference.

TECHNICAL FIELD

This application relates to the field of providing wireless networking service.

BACKGROUND

Wireless networks allow mobile user equipment devices to communicate without a hard wired connection to a network. But proprietary wireless networks require individual login, signup, joining and possibly even credentialing.

SUMMARY

Networking systems and methods here include utilizing an exchange service in communication with a network service, the network service being in communication with a first network and a second network, the exchange service configured to, receive a formation request to form a consortium of networks among the first network and second network, send provision information to a first AP in the first network regarding the second network and a second AP in the second network regarding the first network.

Networking systems and methods here may include an exchange service in communication with a network service, the network service being in communication with a first network and a second network, the exchange service configured to, receive a formation request to form a consortium of networks among the first network and second network, send provision information to a first AP in the first network regarding the second network and a second AP in the second network regarding the first network.

Networking systems and methods here may include an exchange service in communication with a first network controller of a first network and a second network controller of a second network, the exchange service configured to, receive a formation request to form a consortium of networks among the first network and second network, receive an API communication from the first network controller and from the second network controller, in response to the received API communications, send provision information to the first network controller regarding the second network and send provision information to the second network controller regarding the first network.

Networking systems and methods here may include an exchange service in communication with a network service, the network service being in communication with a first network and a second network, the exchange service configured to, allow an operator of the first network to log into the exchange service, receive a query to join a consortium from the operator of the second network, receive a selection of a consortium identifier from the operator of the first network, wherein the consortium includes the second network, associate the first network with the selected consortium, send provision information regarding the first network to APs of the second network, send provision information regarding the second network to APs of the first network.

BRIEF DESCRIPTION OF THE DRAWINGS

In order to understand the invention and to see how it may be carried out in practice, examples will now be described, by way of non-limiting example only, with reference to the accompanying drawings, in which.

DETAILED DESCRIPTION

Figure 1:
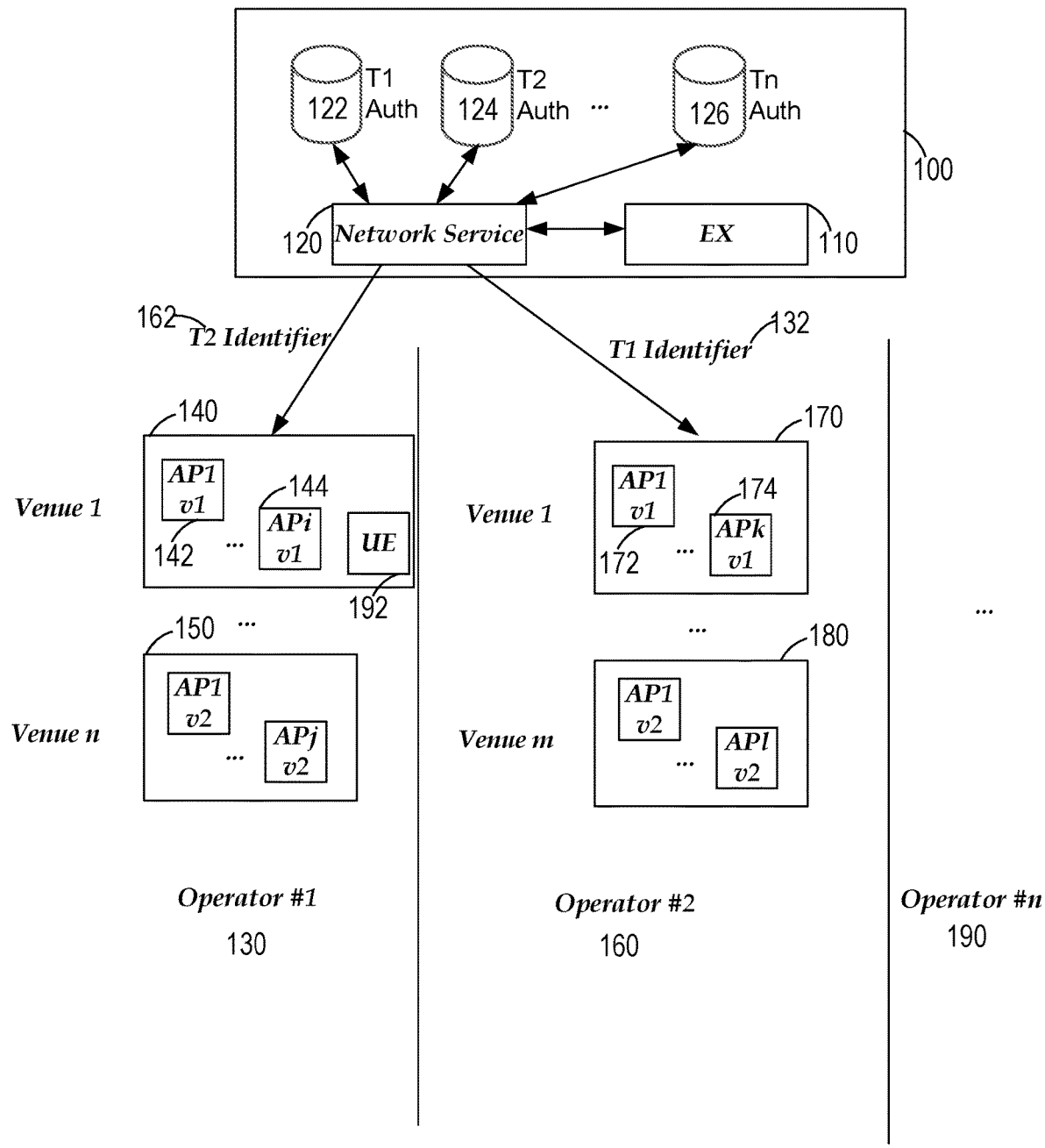
FIG. 1 is a network diagram with multiple APs showing example systems to implement certain examples of the invention described here.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Systems and methods here allow operators of proprietary wireless networks to join consortiums. Such consortiums share information that can allow a user with a wireless user equipment (UE) to move from the coverage of their home network to another network without having to re-enter credentials, enter information to join a new network, pay a new network administrator, etc. Thus, like-minded operators of their own network access points (APs) can form and join consortiums for use by their customers/subscribers. Use of the phrase home network is not intended to be limiting and may mean various types of networks including but not limited to a residence network, the first network to which a user signs up for service, a network to which a user is assigned, or any other type. It is simply sufficient that the home network can be different from another network. Said another way, a user can move from the network with which they originally signed up for service to other networks that are involved as part of the consortium.

It should be noted that the UEs that are capable of wirelessly communicating on such networks could be any number of things including but not limited to cell phones, smartphones, tablets, laptops, phablets, wearable smart devices, automobiles, or any other device capable of wireless communications. Thus, in this disclosure the term UE should not be considered limiting but should be considered as any kind of wireless device capable of wireless communications.

Additionally, the wireless service which may be provided to the user could be any kind of wireless service such as but not limited to WiFi, cellular, LTE, 3G, 4G, 5G, picocell, femtocell, near field, short range, Bluetooth, or any other kind of system and/or radio access network. The APs may be any kind of radio used to communicate wirelessly.

Network Examples

In an example consortium, operators of various venues may provision their venue APs with information about a consortium of member networks. Operators may include those who own the APs, the venues, managed service providers or any other person or entity who manages and/or operates the APs. Such AP provisioning allows a member AP to respond to a UE query with information about the consortium member networks. And if the UE is able to identify another consortium network to which it already belongs, the system is able to access the appropriate authentication service and authenticate the UE. This can allow a UE to use APs operated by consortium members without having to log back into the networks, join a new network, and/or pay a new network administrator.

The example of FIG. 1 shows an established consortium including at least the network run by operator #1 130, operator #2 160 and any additional operators, n 190 all administered by a centralized consortium service 100. Each member of the consortium is shown as an operator 130, 160, 190 each with their own respective venues 140, 150, 170, 180 and each venue with its own respective APs 142 144, 172, 174. Thus, in the example, operator #1 130 could be a local bookstore company which operates two physical stores, or venues 140 150 across town from one another. Within each bookstore venue 140 there may be any number of APs 142 144.

In this example, if operator #1 130 is in a network consortium with a local coffee shop owner, operator #2 160 who operates his own two venues 170, 180 both coffee shops and may be located near the two bookstore venues 140, 150. In such a way, once the consortium is created, a user with UE 192 who has established credentials with the bookstore operator #1 130 at one of their venues 140 can move to the AP coverage of the nearby coffee shop operator #2 160 venue 170 and not have to log in or submit new credentials, join the new network, etc.

It should be noted that the number of operators shown in FIG. 1 are exemplary only, and could include any number of s, as depicted by "n" 190. Also, any number of venues and associated APs may be used by consortium members. A consortium of operators may thereby include any number of APs, in any number of venues.

Customization of consortiums may also exist. For example, if operator #1 130 only wanted one venue 140 to participate in the consortium but not another of the venues 150, the operator could arrange for the various APs in the various venues to be a part of the consortium or not.

Network Based Authentication Service Examples

Multiple arrangements of a network could be utilized as shown in FIG. 1. Again in FIG. 1, the back end systems, or consortium service 100 is shown utilizing a cloud based or networked authentication service arrangement. It should be noted that any kind of virtual arrangement, distributed or local storage, services, virtual service, etc. may be used in these examples. In the example of FIG. 1, an exchange service 110 is shown in communication with a network service platform 120 configured to manage and/or aid in managing consortium member APs, including the provisioning of the APs, as described herein.

In the example of FIG. 1, the network service platform 120 is in communication with multiple authentication services, such as but not limited to an Authorization, Authentication and Accounting (AAA) services/databases 122, 124, 126 for each respective 130, 160, 190. Such arrangement could be logically different services/databases and not necessarily physically separate units. In this example the authentication services store information regarding the subscriber UEs to the various consortium member networks.

Continuing with the example as shown in FIG. 1, the various consortium member networks each have their own identifiers. The service 100 is able to receive the identifiers of each consortium member to allow the exchange service 110 to instruct the network service 120 to provision the consortium member APs with the identifiers of the respective consortium member networks. For example, the APs of operator #1's network 130 would receive provisioning information 162 regarding the identifier of the network run by operator #2 160. And similarly, the APs of the network run by operator #2 160 would receive an identifier 132 which identifies the network run by operator #1 130. In such a way, the APs of the various consortium members are provisioned with the identifiers of not only its own network but all of the other networks of the consortium members.

It should be noted that an AP or a network may belong to more than one consortium. In such examples, network identifiers may be associated to the corresponding consortium identifier so the respective APs may identify which consortium a UE is attempting to utilize.

After this provisioning, when a UE 192 queries any of the member APs about an availability of networks, the response from the provisioned AP can include information about the various consortium member network identifiers. The user may select a network identifier shown by their UE, or the UE 192 itself may automatically select the network identifier with which it has previously joined (e.g., home network).

After this selection, the exchange service 110 may receive a request for authentication of the UE 192 from a venue AP 142 associated with a first operator #1 130 and an indication that this UE 192 has a home network which is run by operator #2 160. The exchange service 110 may then send the request to the authentication service 124 affiliated with the UE's home network, the network run by operator #2 160 in the example. The exchange service 110 will then get a response from the authentication service 124 of the UE's home network 160 and send the response back to the requesting AP 142 either authenticating the UE 192 or not. If authenticated, the UE 192 may then associate to the AP 142 operated by operator #1 130 without further input of credentials or login, etc.

Data Collection Examples

In example embodiments such as that shown in FIG. 1, the systems and methods here may utilize a central management of the APs in the consortiums through the exchange service. This can allow for collection of data regarding the usage of the various APs in the consortium. Such data be stored by the exchange service in data storage and utilized for various purposes. Any kind of data can be measured, monitored and/or stored, including data regarding numbers of users, time of usage, performance data such as throughput and connectivity or any other kind of data.

Another example feature of a centrally managed system may be the ability of such a system to map the collected data for a particular region. For example, the throughput data of various users in the consortium may be plotted on a map to visualize where additional APs should be installed, or where extraneous APs could be removed or repositioned. In an example, available bandwidth for various consortium APs may be gathered and mapped. These data collections and maps could be for one or many APs in the network and/or consortium.

Alternatively or additionally, a central management feature may include implementation of certain rules or set of rules within the consortiums. For example, a rule may include time restrictions for UEs, time restrictions dealing with paying fees, time restrictions on forcing a log off, data usage restrictions for billing purposes, and/or data usage restrictions for band width management. Any of these or any combination of these or other rules may be used.

The central management could be configured to enforce rules, even across multiple APs throughout the consortium. In one example, a user has paid for a cap of 10 gigabytes (GB) of data, and that user's UE consumes 9 GB of data at venue #1 and then moves to venue #2, which is a part of the same consortium as venue #1. In such an example, the central management may send a message or log off the user's UE if the user's UE consumes the last 1 GB of data at venue #2, because their total overall consortium data usage cap was met at 10 GB. Rules can be associated with users, operators, network operators, managed service operators or other types of operators based on role.

Such a centrally managed consortium example could also be used to modify which operators and which venues are part of the consortium. For example, the central management could disassociate members of the consortium by re-provisioning consortium member APs without including the identifier of the disassociated ex-member. Additionally, the identifiers of the consortium members could be deleted from the APs of the ex-member. In such a way, an ex-member of a consortium would lose the ability to share its network with subscribers of the consortium, and the subscribers of the consortium could no longer utilize the network of the ex-member without separately logging in, paying, joining, etc.

In certain examples, the establishment of a consortium may allow for the members of the consortium to perform billing mediation and/or aggregation for their subscribers.

Certain examples may include creating and using a directory service provided by the exchange service in order to allow finding consortiums more easily. Such a directory could include any number of information and/or metrics such as geographic location of members, bandwidth availability, subscriber user statistics, etc. Such metrics could be searchable and/or categorized.

Certain examples may allow for the creation of roaming consortiums. Such roaming consortiums may allow for different geographically dispersed consortiums to still share accessibility to members as described herein.

It should be noted that the systems and methods here, including the consortium service and/or exchange service features need not necessarily be available only to AP operators who purchase an AP from a specific company which also operates the consortium service. In certain examples, that may be the case, but in certain example embodiments, the owner/operator/administrator of the consortium service may allow operators of APs made by third parties to connect to the consortium service and opt into a consortium as described herein. Such a service could be AP agnostic in terms of manufacturer and could be offered as a networked service for any kind of AP that is able to communicate with the consortium service via a network such as the Internet. In such examples, the owner/operator/administrator of the consortium service could charge a fee for the service depending on any kind of metric such as number of users, amount of data, etc.

Third Party Access Examples

Alternatively or additionally, the systems and methods here could be used to identify and track bandwidth use and bandwidth availability at any AP in a consortium. For example, if an AP at one venue in a consortium has available bandwidth at certain times of day, such information could be shared with any kind of third parties such as a third party wireless service provider. The information could come in any form including a map of available bandwidth at various days or times of day. The wireless service providers could compare the available bandwidth areas with their own needs, and lease available bandwidth, or a portion of the available bandwidth, from relevant AP operators.

Network Examples with Web Service

Figure 2:
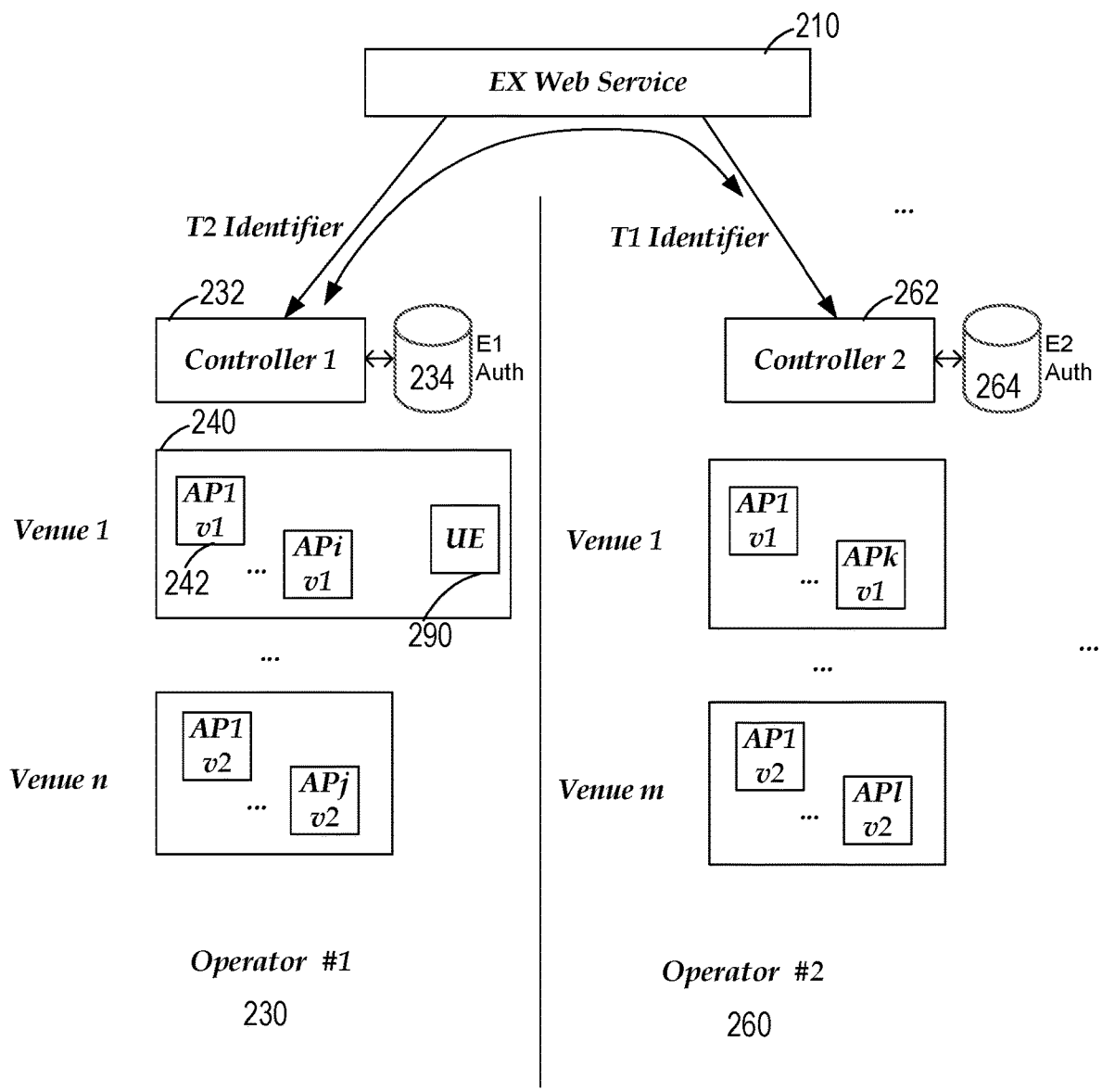
FIG. 2 is another network diagram with multiple APs showing example systems to implement certain examples of the invention described here.

An example of a consortium network is shown in FIG. 2. The example shown in FIG. 2 assumes the UE 290 has already signed up with her home network run by operator #2 260 and that the consortium is established including at least the network run by operator #1 230 and operator #2 260.

In this example, the exchange service 210 is shown as a web service in communication with respective controllers 232, 262 of the operators 230, 260. Each respective controller 232, 262 is shown in communication with its own local authentication services 234, 264. Thus, in this option, each operator's controller has its own associated authentication service with which to store subscriber information for authentication purposes.

In the example of FIG. 2, the APs of the operator venues are provisioned with information regarding the various networks of the consortium as described above. So, for example, AP 242 of venue 1 240 of operator #1 230 would receive provisioning information about the network operated by operator #2 260. Likewise, the APs for operator #2's network would be provisioned with information about the network of operator #1.

As described above, an example UE 290 may have a home network to which it subscribes, for example, operator #2's 260 network. In the consortium example, the UE could still move to network coverage of a visited network, for example the network run by operator #1 230 and the UE 290 could query any of the APs within that network about other affiliated networks, for example, consortium member networks.

In the FIG. 2 example, because the APs are already provisioned with information regarding the other consortium members, they can respond to the UE 290 query with affiliated network information and manually, by user input, or automatically by the UE 290, select the home network identifier which in this example is the home network run by operator #2 260 which is a consortium member of the network run by operator #1 230 where the UE is attempting to associate.

In certain examples, another way to provision an AP may be through a command line interface (CLI) interaction. In this example, the provisioning information could come from an API or email message or any other way.

To authenticate the UE 290, in the example of FIG. 2, the AP 242 may send an authentication request to its own network's respective controller 232 which would then send the request to the exchange service 210 indicating which home network the particular UE 290 selected. The exchange service 210 may receive that request for authentication of the UE 290, send the request to the appropriate designated network controller 262 for the home network, which can query its own authentication service 264, get a response from that authentication service, and then send the authentication response back to the requesting controller 232.

Within the example of FIG. 2 there could be two options for provisioning the consortium member APs with the consortium information. In the first option example, controllers may receive an email which contains information about the consortium members and respective identifiers. Such information may be manually entered into the APs or a link may contain the information needed to provision the APs automatically. In the second option example, the exchange service's APIs permit automated exchange of provisioning information with the controllers containing the consortium members' identifier information. Any combination of these examples could be used as well.

Network Examples with a UE Query

Figure 3:
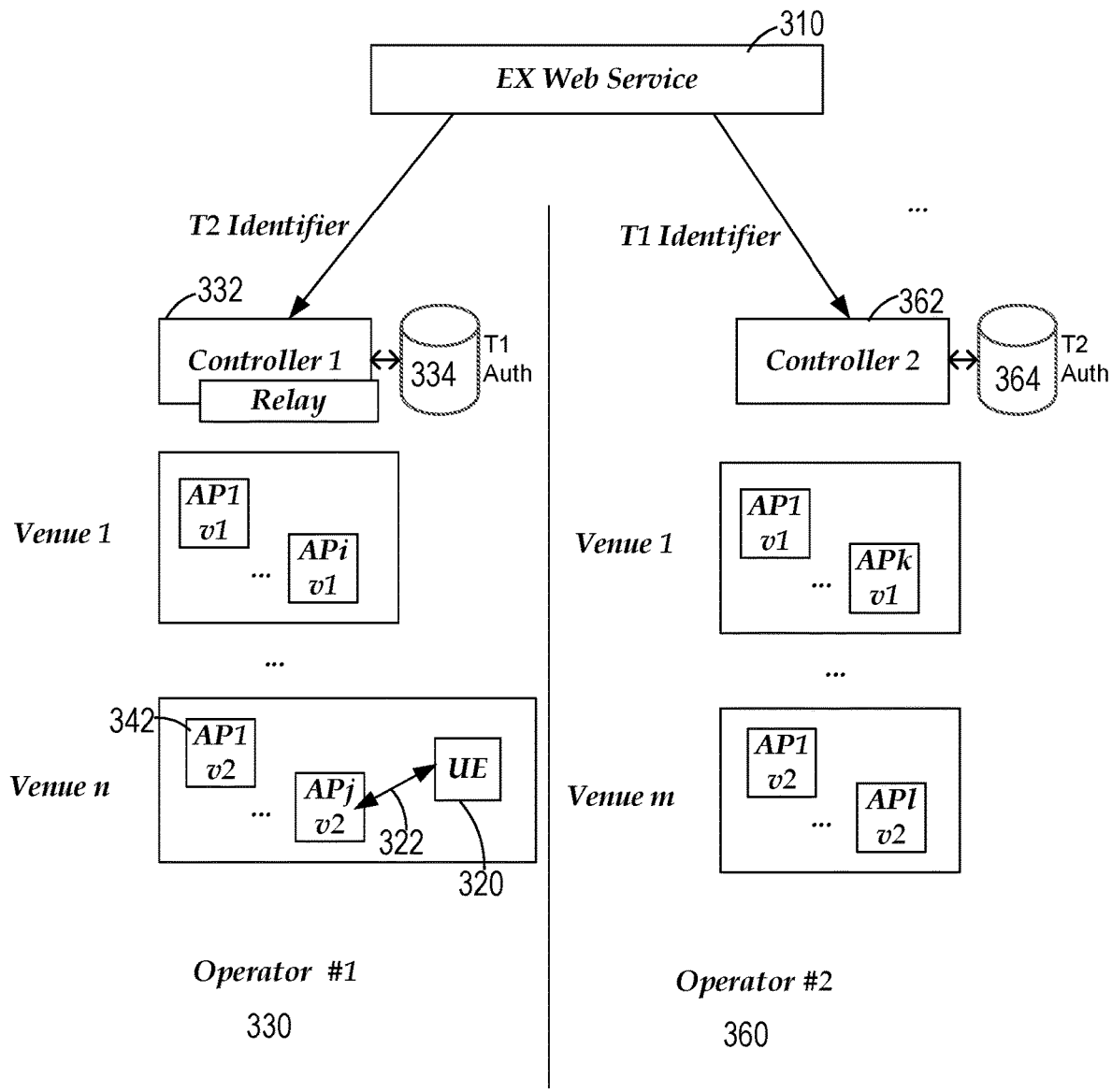
FIG. 3 is another network diagram with multiple APs showing example systems to implement certain examples of the invention described here.

The example shown in FIG. 3, assumes the UE 320 has already signed up with the home network run by operator #2 360 and that a consortium is established among operator #1 330 and #2 360.

In this example, the APs of the various consortium members are not provisioned with information regarding other members of the consortium. Instead, the APs utilize a response to a UE request with an indication to wait while the system checks the availability of the requested network. Because the individual APs are not provisioned with the identifiers of the member networks as in other examples, the APs must request that information from their respective controller, which may in turn request the information from an exchange web service 310.

Thus, in the example of FIG. 3, when a UE 320 visits a network, run by operator #1 330, which is in a consortium with operator #2 360, the UE 320 first sends the respective AP 342 an Access Network Query Protocol (ANQP) or any other kind of affiliation request 322. The AP 342 could respond to the UE's request with an indication to wait until the request is answered. The UE request may be passed on to the controller 332 in the network and then to the exchange service 310. The exchange service 310 could then respond with the information regarding the identifiers of the consortium members. The response could be passed back to the UE 320 with information about the available networks and/or consortiums members. The user of the UE 320 could manually select and/or the UE could automatically select its home network 360 if it is included in the response from the exchange service 310. After the selection, the UE 320 may then send a request for authentication to the AP 342 and then the exchange server 310 which could query the respective controller 362 of the indicated selected home network 360.

The home network controller 362 could query its respective authentication service 364 and send an authentication response back to the exchange service 310 to pass back to the controller 332 and the AP 342 which forwarded the request from the UE 320.

Hybrid Network Examples

It should be noted that a combination of the various different network arrangements discussed above is possible, depending on the administration of the network(s). Thus, for example, a networked authentication may be available for certain members of a consortium and a local authentication may be available on others. The exchange service could access authentication information from whichever authentication service is being used by the respective network.

It should be noted that a combination of the various AP provisioning arrangements could be made as well, such as those examples found in FIG. 1 and FIG. 2 and FIG. 3. In such examples, one network in the consortium may have provisioned APs while others relies on a relay of the request to the exchange service. Any combination of the above embodiments could be utilized.

Operator Consortium Establishment Examples

Figure 4:
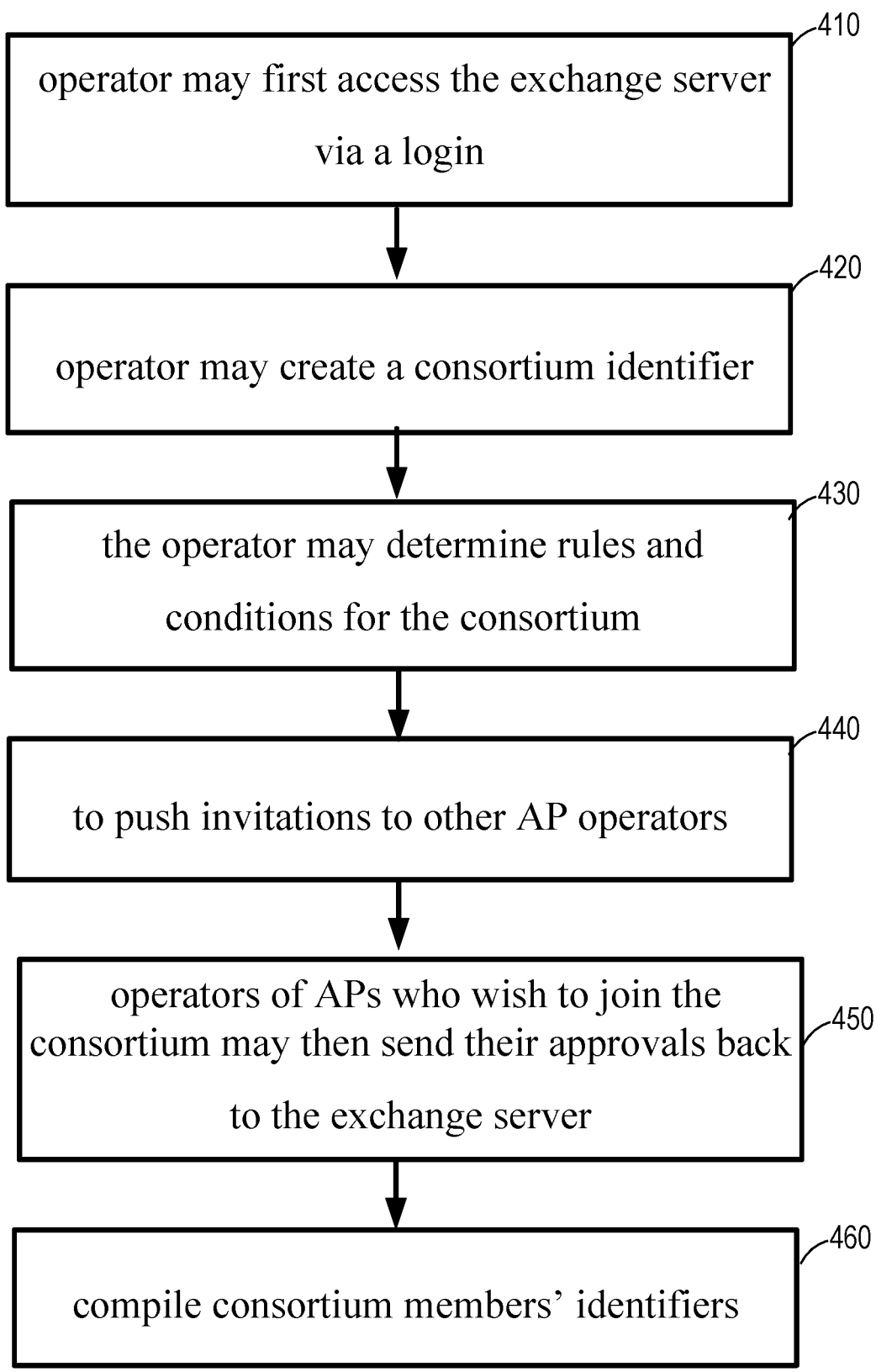
FIG. 4 is an example flow chart of steps which may be used to implement certain examples of the invention described here.

In certain examples, consortiums could be created by a system administrator and/or an operator and invitations sent to potential members. FIG. 4 shows an example of steps such a consortium creator may take. For example, the operator may first access the exchange service, such as via a login 410. Next, the operator may create a consortium identifier 420. Such an identifier may be used to identify the consortium in the system and also to allow operators to find and join the consortium.

Next, the operator may determine rules and conditions for the consortium 430. Such determinations could be a range of options including but not limited to terms of service, cost to join, pricing for usage, access policies, etc. Once established, the operator may optionally wish to push invitations to other AP operators 440 via email or SMS for example. Additionally or alternatively, an invitation to join the consortium could be sent by the first venue operator who is establishing the consortium with a link to select to opt in to the consortium. The message could be sent to and from the consortium service and/or exchange service which could then include the venue APs in the consortium whose operators choose to opt in to the consortium.

Once the invitations are sent, operators of APs who wish to join the consortium may then utilize the link if sent, to send their approvals back to the exchange service 450, or their rejection of the invitation. Additionally or alternatively, other examples could utilize automatic approvals based on lists of AP operators, geographically determined consortium members, open consortiums for any network, or any other such example.

Once the exchange service has received approvals to join the established consortium, it could then compile a list of identifiers for the members of the consortium 460. This list of consortium member identifiers could be used to provision APs in examples where such provisioning is used, or to find affiliated networks.

Joining an Existing Consortium Examples

In certain examples, a consortium may be established, either by a system administrator or by an AP operator. FIG.

Figure 5:
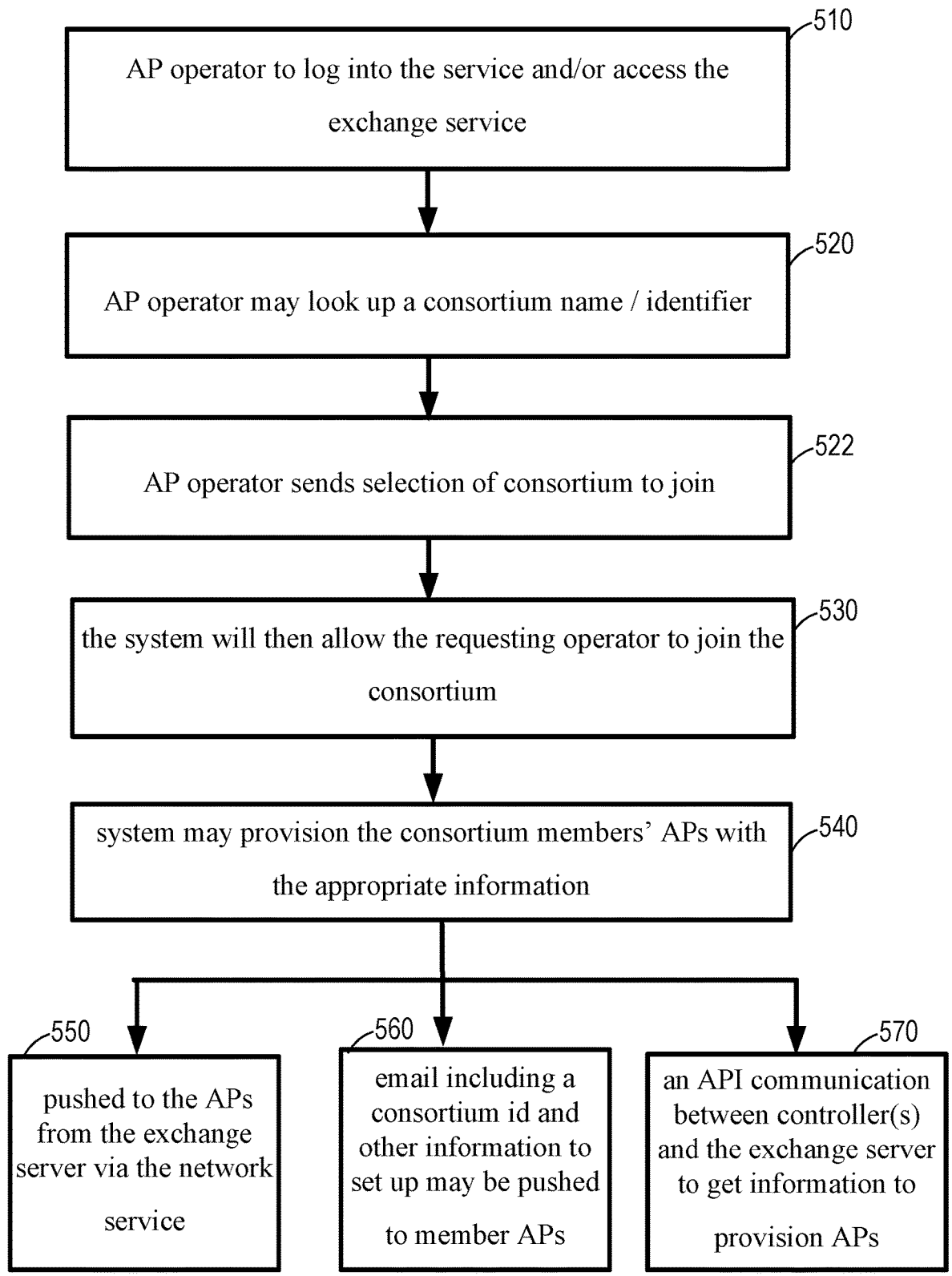
FIG. 5 is an example flow chart of steps which may be used to implement certain examples of the invention described here.

5 shows example steps of how an AP operator may join an existing consortium. It should be noted that the example steps of FIG. 5 relate to the examples described above of FIG. 1 as well as the two options described in FIG. 2. Joining a consortium in an example where no provisioning of APs occurs, such as those discussed in FIG. 3 may skip the provisioning steps but still utilize the other steps of the example to join a consortium.

In the example, to join an existing consortium, the first step is for the AP operator to log into the service and/or access the exchange service 510. Next, the AP operator may look up a consortium name and/or identifier 520 in the system based on any of various methods. For example, the operator may enter a text search or select from a list based on a known consortium name, a known consortium identifier, a consortium location, a consortium affiliation, a consortium industry, a consortium with certain geographical boundaries, or any other kind of criteria. Another kind of search may be based on existing and/or targeted subscribers to a particular consortium. Such a search may seek out particular UE users based on their credentials. For example, an operator could use big data principles to find a desired set of potential affiliations of users and join a consortium where such users may frequent.

In some examples, alternatively or additionally, to join a consortium, an operator may utilize a link sent in an invitation as described above. Such an invitation may include a consortium identifier and/or link to the exchange service system to allow admission for the recipient of the link to join to the identified consortium.

In examples where the operator does not have an invitation, after finding a consortium she wishes to join, that operator may send a request to the exchange service requesting to join the consortium 522. In certain examples, if the administrator or the consortium establisher may have arranged for this particular operator to join, or allow any operator to join, and/or allow certain operators to join based on a preset criteria. In such cases, the exchange service will then allow the requesting operator to join the consortium 530.

In certain examples, terms of service may be presented to an operator before being allowed to join. Acceptance of the terms of service may be needed in such examples, for the membership of the operator to be approved. In other examples, the system may have other criteria which the requesting operator must meet in order to be accepted to the consortium.

Next, in examples where the APs are provisioned with consortium member identifiers, the system may provision the consortium members' APs with the appropriate information to indicate that a new member of the consortium has joined 540, and provision the new member APs with the consortium identifiers as described herein.

In certain examples, such as those described in FIG. 1, a consortium ID and/or identifiers of individual consortium members are provisioned to the APs from the exchange service via the network service 550.

In certain example embodiments, such as that shown in FIG. 2 where the authentication services are locally established and controllers communicate with the authentication services for AP management, email including a consortium identifier, consortium member identifiers and/or other information to provision an AP may be pushed to member APs 560.

Still referring to the example of FIG. 2 but in an example where the consortium service and/or exchange service is responsible for managing the APs, the system may use an API communication between the controller and the exchange service to get information to provision APs 570. Such information may include a consortium identifier and/or consortium member identifiers.

Peer to Peer Examples

In certain example embodiments, a centralized consortium service and/or exchange service may not even be involved with authentication of a user's credentials between and among APs. In such a peer-to-peer arrangement, APs could request and compare stored user credentials with newly requested association requests over a network.

HS2.0 Examples

HotSpot 2.0 is a system that allows for automatic association with WiFi APs. The systems and methods here could be used with HS2.0 because of the ability to allow UEs to automatically associate with a WiFi AP by identifying a home network that is a consortium member. In such an example, the UE utilizing HS2.0 could move among the APs in the consortium after an initial HS2.0 authentication.

Example Computing Equipment

Figure 6:
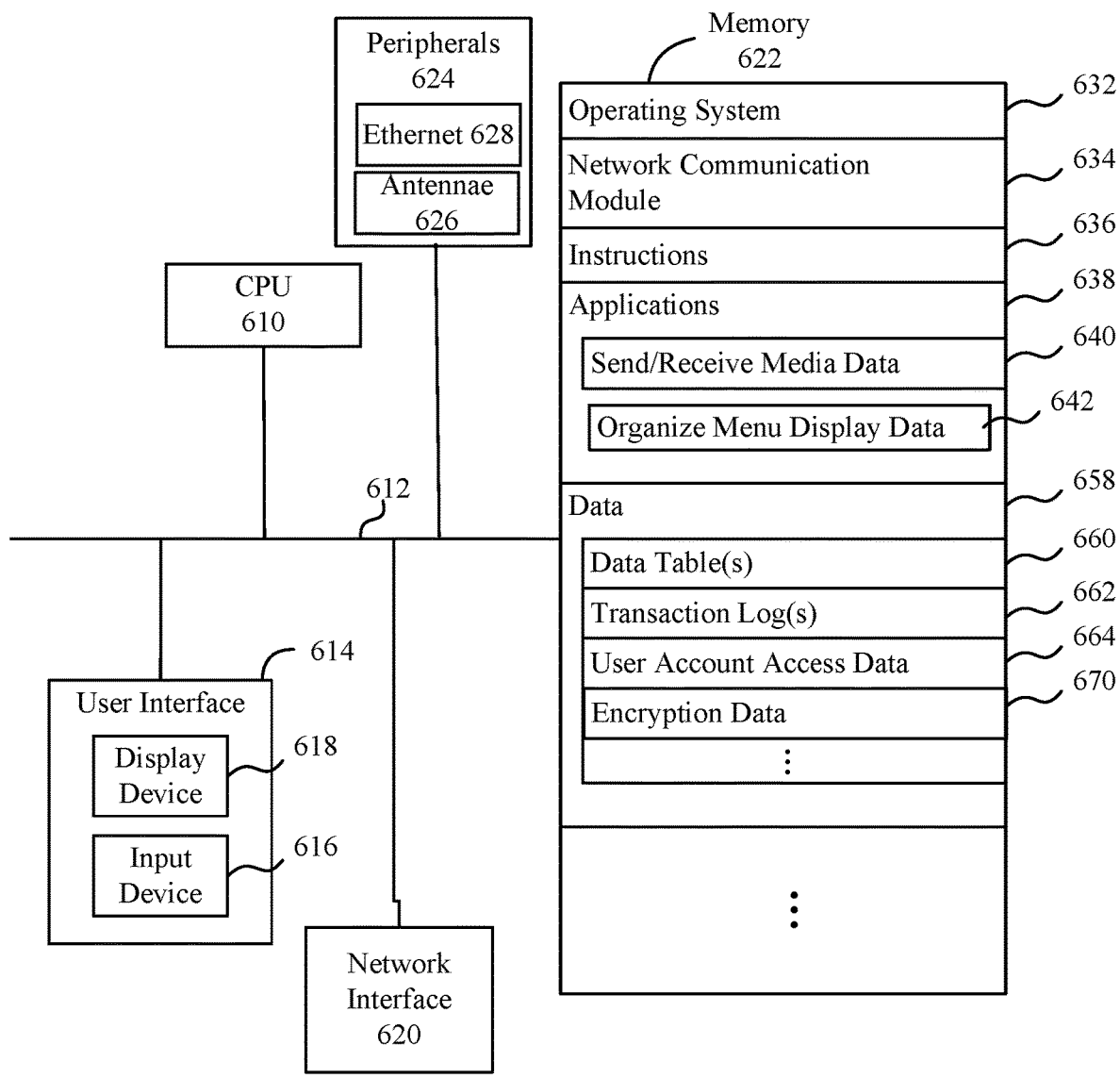
FIG. 6 is an example networking device according to some embodiments of the invention described here.

FIG. 6 shows an example piece of computing equipment 600 such as the consortium service 100, exchange service 110, AP 142 and/or network service platform 120 from FIG. 1. The computing device 600 of FIG. 6 is shown with a central processor CPU 610 that could include any number of computer processors. The CPU 610 is shown in communication by a bus 612 or other way to a number of features including a user interface 614. The user interface 614 could include a display 618 such as a screen or lights and/or input device 616 such as a touchscreen, buttons, keyboard, mouse, wheel, rollerball, joystick, etc. The CPU 610 is also shown in communication with a network interface 620 as well as peripherals 624 such as antennae 626 for the various wireless communications such as WiFi, cellular, infrared, Bluetooth Low Energy, etc. Also shown is an Ethernet 628 connection which could be any kind of wired connection. The CPU 610 is also shown in communication with a memory 622. The memory includes software instructions which are executed by the CPU 610 to perform tasks. The memory 622 is shown including an operating system 632 a network communication module 634, instructions for other features 636 and applications 638 such as sending and receiving media data 640 and organization of menu display data 642. The data storage 658 includes storage of various data arranged in a data table 660, transaction log 662, which can store user account access data 664 and encryption data 670.

CONCLUSION

As disclosed herein, features consistent with the present invention may be implemented via computer-hardware, software and/or firmware. For example, the systems and methods disclosed herein may be embodied in various forms including, for example, a data processor, such as a computer that also includes a database, digital electronic circuitry, firmware, software, computer networks, services, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best utilize the invention and various examples with various modifications as are suited to the particular use contemplated.

What is claimed is:

1. An exchange server, comprising:
an interface circuit;
a processor; and
memory configured to store program instructions, wherein, when executed by the processor, the program instructions cause the exchange server to perform operations comprising:
receiving a formation request to form a consortium of networks comprising a first network and a second network that allows network sharing of electronic devices, wherein access points in the first network do not communicate with access points in the second network;
providing, addressed to a first access point in the first network, first provision information regarding the second network;
providing, addressed to a second access point in the second network, second provision information regarding the first network;
receiving, associated with the first access point, a request to authenticate an electronic device, wherein the request indicates that the electronic device is associated with the second network, and the request comprises credentials for the second network;
authenticating, based at least in part on the credentials, the electronic device with an authentication server associated with the second network; and
providing, addressed to the first access point, authentication approval to allow the electronic device to associated with the first network using the credentials.

2. The exchange server of claim 1, wherein the operations comprise:
providing, addressed to a computer, an invitation for a third network to join the consortium.

3. The exchange server of claim 1, wherein, after providing the authentication approval, the operations comprise:
monitoring the electronic device; and
enforcing rules for an account associated with the electronic device established with the second network.

4. The exchange server of claim 1, wherein the operations comprise:

collecting data regarding usage of the first access point, the second access point and the electronic device.

5. The exchange server of claim 4, wherein the operations comprise:
mapping the collected data corresponding to locations of the collected data.

6. The exchange server of claim 1, wherein the operations comprise:
receiving a set of rules regarding usage of access points in the consortium by one or more electronic devices; and
enforcing the set of rules by restricting operation of the one or more electronic devices.

7. The exchange server of claim 1, wherein the operations comprise:
allowing a third party to access the access points in the consortium to provide a service to the electronic device.

8. The exchange server of claim 1, wherein at least one of the first access point and the second access point is compatible with at least one of: an IEEE 802.11 communication protocol, or a cellular-telephone communication protocol.

9. The exchange server of claim 1, wherein the operations comprise:
receiving, from a computer associated with the first network, conditions for membership to the consortium.

10. The exchange server of claim 1, wherein authenticating the electronic device comprises:
receiving, associated with the first access point, an authentication request from the electronic device;
providing, addressed to the authentication server, an authentication request; and
receiving, associated with the authentication server, an authentication response.

11. The exchange server of claim 1, wherein the first provision information comprises a network identifier for the first network and the second provision information comprises a network identifier for the second network.

12. The exchange server of claim 1, wherein, when the second network is disassociated from the consortium, the operations comprise:
providing, addressed to the first access point, first updated provision information without information regarding the second network, and
providing, addressed to the second access point, second updated provision information without information regarding the first network.

13. A method for providing network sharing, comprising, by an exchange server:
receiving a formation request to form a consortium of networks comprising a first network and a second network that allows network sharing of electronic devices, wherein access points in the first network do not communicate with access points in the second network;
providing, addressed to a first access point in the first network, first provision information regarding the second network;
providing, addressed to a second access point in the second network, second provision information regarding the first network;
receiving, associated with the first access point, a request to authenticate an electronic device, wherein the request indicates that the electronic device is associated with the second network, and the request comprises credentials for the second network;
authenticating, based at least in part on the credentials, the electronic device with an authentication server associated with the second network; and
providing, addressed to the first access point, authentication approval to allow the electronic device to associated with the first network using the credentials.

14. The method of claim 13, wherein, after providing the authentication approval, the method comprises:
monitoring the electronic device; and
enforcing rules for an account associated with the electronic device established with the second network.

15. The method of claim 13, wherein authenticating the electronic device comprises:
receiving, associated with the first access point, an authentication request from the electronic device;
providing, addressed to the authentication server, an authentication request; and
receiving, associated with the authentication server, an authentication response.

16. The method of claim 13, wherein the method comprises:
providing, addressed to a computer, an invitation for a third network to join the consortium.

17. The method of claim 13, wherein the method comprises:
determining whether the second network meets one or more joining criteria of the consortium; and
wherein the providing of the first provision information and the second provision information is based at least in part on the determining.

18. A non-transitory computer-readable storage medium for use in conjunction with an exchange server, the computer-readable storage medium storing program instructions that, when executed by the exchange serve cause the exchange server to perform one or more operations comprising:
receiving a formation request to form a consortium of networks comprising a first network and a second network that allows network sharing of electronic devices, wherein access points in the first network do not communicate with access points in the second network;
providing, addressed to a first access point in the first network, first provision information regarding the second network;
providing, addressed to a second access point in the second network, second provision information regarding the first network;
receiving, associated with the first access point, a request to authenticate an electronic device, wherein the request indicates that the electronic device is associated with the second network, and the request comprises credentials for the second network;
authenticating, based at least in part on the credentials, the electronic device with an authentication server associated with the second network; and
providing, addressed to the first access point, authentication approval to allow the electronic device to associated with the first network using the credentials.

19. The non-transitory computer-readable storage medium of claim 18, wherein, after providing the authentication approval, the operations comprise:
monitoring the electronic device; and
enforcing rules for an account associated with the electronic device established with the second network.

20. The non-transitory computer-readable storage medium of claim 18, wherein authenticating the electronic device comprises:
- receiving, associated with the first access point, an authentication request from the electronic device;
- providing, addressed to the authentication server, an authentication request; and
- receiving, associated with the authentication server, an authentication response.

\* \* \* \* \*